United States Patent
Serizawa et al.

(10) Patent No.: US 7,355,617 B2
(45) Date of Patent: Apr. 8, 2008

(54) OPTICAL SCANNER AND IMAGE FORMING APPARATUS

(75) Inventors: Keiichi Serizawa, Kanagawa (JP); Yasumasa Tomita, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 11/770,865

(22) Filed: Jun. 29, 2007

(65) Prior Publication Data

US 2007/0247510 A1    Oct. 25, 2007

Related U.S. Application Data

(62) Division of application No. 10/733,246, filed on Dec. 12, 2003, now Pat. No. 7,256,813.

(30) Foreign Application Priority Data

| Dec. 12, 2002 | (JP) | ............................ 2002-360518 |
| Dec. 20, 2002 | (JP) | ............................ 2002-369624 |
| Feb. 21, 2003 | (JP) | ............................ 2003-043591 |

(51) Int. Cl.
*B41J 2/435* (2006.01)
*B41J 27/00* (2006.01)

(52) U.S. Cl. ..................... 347/245; 347/257

(58) Field of Classification Search ............... 347/229, 347/234–235, 241–243, 245, 248–250, 256–261; 359/204
See application file for complete search history.

(56) References Cited

U.S. PATENT DOCUMENTS

| 4,826,268 A | 5/1989 | Kramer |
| 6,137,614 A | 10/2000 | Endoh |
| 6,411,325 B1 | 6/2002 | Matsushita et al. |
| 6,501,585 B2 * | 12/2002 | Shiraishi et al. ............ 359/204 |
| 6,657,650 B1 * | 12/2003 | Omelchenko et al. ...... 347/234 |
| 2003/0156310 A1 | 8/2003 | Suzuki et al. |
| 2004/0036936 A1 | 2/2004 | Nakajima et al. |

FOREIGN PATENT DOCUMENTS

| JP | 06-075184 | 3/1994 |
| JP | 06-189081 | 7/1994 |
| JP | 8-76038 | 3/1996 |
| JP | 08076038 A | 3/1996 |
| JP | 10-104537 | 4/1998 |
| JP | 11-133334 | 5/1999 |
| JP | 11-202238 | 7/1999 |
| JP | 2000-258715 | 9/2000 |
| JP | 2001-30538 | 2/2001 |
| JP | 2001-147390 | 5/2001 |

(Continued)

*Primary Examiner*—Hai Pham
(74) *Attorney, Agent, or Firm*—Oblon, Spivak, McClelland, Maier & Neustadt, P.C.

(57) ABSTRACT

An optical scanner for writing an electrostatic latent image on an image carrier includes a scanning optical system that forms an optical scanning path, a pair of optical detecting units arranged at two positions on the optical scanning path for detecting a write-start position and a write-end position to measure a time for scanning from the write-start position to the write-end position, and an optical housing that houses at least the scanning optical system and the optical detecting units. The optical detecting units are mounted on the optical housing via an intermediate member having a thermal expansion coefficient smaller than that of the optical housing.

9 Claims, 10 Drawing Sheets

FOREIGN PATENT DOCUMENTS

| | | |
|---|---|---|
| JP | 2001174693 A | 6/2001 |
| JP | 2001-287404 | 10/2001 |
| JP | 2001-350110 | 12/2001 |
| JP | 2002-122799 | 4/2002 |
| JP | 2002-196272 | 7/2002 |
| JP | 2002-333587 | 11/2002 |

* cited by examiner

SCANNING DIRECTION

SCANNING TIME = t

OPTICAL SCANNER AND IMAGE FORMING APPARATUS

CROSS-REFERENCE TO RELATED APPLICATIONS

This application is a Divisional of and is based upon and claims the benefit of priority under 35 U.S.C. § 120 for U.S. Ser. No. 10/733,246, filed Dec. 12, 2003, now U.S. Pat. No. 7,256,813 and claims the benefit of priority under 35 U.S.C. § 119 from Japanese Patent Application No. 2002-360518, filed Dec. 12, 2002, 2002-369624, filed in Japan on Dec. 20, 2002 and 2003-043591, filed in Japan on Feb. 21, 2003, the entire contents of each which are incorporated herein by reference.

BACKGROUND OF THE INVENTION

1) Field of the Invention

The present invention relates to an image forming apparatus and an optical scanner in the image forming apparatus to optically scan and write an image on an image carrier.

2) Description of the Related Art

In an optical scanner employed in an image forming apparatus such as a copying machine, a printer, a facsimile machine, or a multifunction product, optical parts such as a light source, a polygon mirror, various lenses, and a reflection mirror are provided to form an optical scanning path. A laser beam from the light source is reflected by the polygon mirror to perform deflection scanning. Deflected optical beam passes through a scanning lens, reflected by the reflection mirror, and emitted to outside of the optical housing to perform writing on an image carrier.

One example of such an optical scanner is explained, with reference to FIGS. 12 to 14. The optical scanner 21 includes a laser source 22 that emits a laser beam, a rotating mirror deflector 23 to deflect the laser beam emitted from the laser source 22, a scanning optical system 25 that forms a scanning path for scanning the peripheral surface of a photosensitive member 24, synchronous detecting units 26 and 27 to which a part of the laser beam deflected by the rotating mirror deflector 23 is irradiated as a synchronous detecting beam, and an optical housing 28 that houses and holds the laser source 22, the rotating mirror deflector 23, the scanning optical system 25, and the synchronous detecting units 26 and 27. The scanning optical system 25 includes lenses 25a and 25b, and a reflection mirror 25c.

In this optical scanner 21, the laser beams emitted from the laser source 22 are deflected by the rotating mirror deflector 23 rotated at a high speed, and the scanning path is formed from the deflected laser beams by the scanning optical system 25. This scanning path scans the peripheral surface of the photosensitive member 24, to thereby form an electrostatic latent image on the peripheral surface of the photosensitive member 24. This electrostatic latent image is developed by a toner to become a toner image, and the toner image is transferred onto a recording medium to perform image forming onto the recording medium. A part of the laser beams deflected by the rotating mirror deflector 23 is detected as the synchronous detecting beam by the synchronous detecting units 26 and 27. Based on a result of the detection, a scanning start position and a scanning end position of the scanning path are restricted.

In such an optical scanner, pixel density in the horizontal scanning direction is determined by a write clock frequency and the horizontal scanning speed of the lens optical system. It is important to accurately maintain the write density for obtaining excellent image quality. In the optical scanner having a plurality of optical scanning paths like the color image forming apparatus, if the pixel density is different for each optical scanning path, when images written by using the respective optical scanning paths are superposed, out-of-color registration occurs. Therefore, it is especially important to accurately maintain the write density.

Accordingly, in the conventional optical scanners, there is one in which a pair of optical detecting units is arranged on the write-start position side and the write-end position side outside the image area of the optical scanning path, to measure the horizontal scanning time between the two points by the detection timings, a variation quantity from the aimed horizontal scanning magnification is calculated from the measurement result, and the write clock frequency is changed according to the variation quantity, to thereby correct an error in the horizontal scanning magnification.

In this type of optical scanner, however, since a pair of optical detecting units is directly fixed on the optical housing, the distance between the pair of optical detecting unit changes due to a thermal deforming of the optical housing by a change in the ambient temperature, and hence accurate scanning time cannot be obtained.

The cause of thermal deforming occurring in the optical housing is not only the heat from the rotating mirror deflector, but also the heat from a heat source provided in the image forming apparatus, for example, a fixing unit and a power source unit. In other words, when the optical scanner is fixed in the image forming apparatus, a difference in thermal expansion occurs in the optical housing between the side close to the fixing unit, being the heat source, and the side away from the fixing unit, thereby causing a misalignment of the synchronous detecting unit close to the heat source, and the synchronous detecting unit away from the heat source.

Further, the temperature rise in the optical housing affects not only the misalignment of the scanning path, but also the beam spot diameter of the scanning path exposed on the surface of the photosensitive member. That is, the refractive index of the lenses constituting the scanning optical system changes due to the temperature change in the optical housing, and a predetermined beam spot diameter cannot be obtained, thereby causing image deterioration due to thickening of the beam spot diameter.

On the other hand, the mounting location of the synchronous detecting unit should be fixed at all times, but the position thereof slightly changes periodically, due to vibrations of the optical housing by the rotation of the rotating mirror deflector, or due to propagation of vibration from the driving unit of the image forming apparatus. As a result, the scanning start position and the scanning end position of the respective scanning paths change periodically, thereby causing image deterioration referred to as a so-called image fluctuation of longitudinal line.

Therefore, an invention in which variations in the distance between two optical detecting units due to a temperature change are eliminated as much as possible, to perform correction to a precise write clock frequency, so as to obtain a precise write density in the horizontal scanning direction has been disclosed (see, for example, Japanese Patent Application Laid-open No. H8-76038).

Such an optical scanner will be explained based on FIG. 15. Like reference signs designate like parts as in FIGS. 12 to 14, and explanation thereof is omitted. This optical scanner 21a has the same components as those of the optical scanner 21 explained with reference to FIGS. 12 to 14, and the different point is the arrangement position of the synchronous detecting units 26a and 27a. In the optical scanner 21 explained with reference to FIGS. 12 to 14, the synchronous detecting units 26 and 27 are arranged on the opposite side of the rotating mirror deflector 23, with the scanning optical system 25 put therebetween, and are away from the rotating mirror deflector 23 and the laser source 22. On the other hand, in the optical scanner 21a, the synchronous detecting units 26a and 27a are arranged at a position close to the rotating mirror deflector 23 and the laser source 22.

As described above, the optical scanner in the Patent Literature 1 is an optical scanner in which a pair of optical detecting units is arranged on an optical scanning path, to measure the scanning time from the write-start position to the write-end position, wherein at least one of the optical detecting units is fixed to the optical housing, via an intermediate member having a thermal expansion coefficient larger than that of the optical housing. The thermal deforming quantity of the optical housing and the thermal deforming quantity of the intermediate member are counterbalanced, so that a variation in the distance between the optical detecting units due to the influence of heat is reduced.

Further, an invention in which even when the heat generation state is different between the housing in which a scanning optical system is housed and a drum support in which a photosensitive drum is housed, the scanning start position and the scanning end position of the scanning path with respect to the respective photosensitive drums can be made uniform has been disclosed (see, for example, Japanese Patent Application Laid-open No. 2000-258715).

However, as an actual problem, counterbalancing of the thermal deforming quantity of the optical housing and the thermal deforming quantity of the intermediate member is not so easy. Further, in the optical scanner having a plurality of optical scanning paths, the optical housing and the intermediate member in the optical scanning paths do not always generate the same thermal deforming, and a misalignment occurs between the optical scanning paths due to a difference in the thermal deforming. Particularly, in the case of a color image forming apparatus, there is a problem of causing out-of-color registration.

This problem will be specifically explained, with reference to FIGS. 12 to 15. The rotating mirror deflector 23 and the laser source 22 are members generating heat when being driven, and due to heat generation of the rotating mirror deflector 23 and the laser source 22, the optical housing 28 thermally expands and deforms.

However, the deforming due to the thermal expansion of the optical housing 28, and the arrangement of the synchronous detecting units 26 and 27 (26a and 27a) are not taken into consideration.

Therefore, as shown in FIG. 13, the optical housing 28 deforms from the position indicated by the actual line to the position indicated by the broken line due to thermal expansion, and the synchronous detecting units 26 and 27 misalign with the deforming, and the synchronous detecting beams detected by the synchronous detecting units 26 and 27 change from "A" to "A'", due to the misalignment. In other words, the detection timing of the synchronous detecting beam by the synchronous detecting units 26 and 27 changes, and the scanning time of the scanning path for scanning the photosensitive member 24 extends from "t" to "t+Δt". In the image formed on a recording medium, the length in the horizontal scanning direction changes before and after the thermal expansion of the optical housing 28, thereby causing a magnification error. The same thing applies in the optical scanner 21a shown in FIG. 15.

As shown in FIG. 14, since the synchronous detecting beam "A" is made to enter obliquely with respect to the synchronous detecting unit 27, the light amount per unit area of the synchronous detecting beam "A" on the synchronous detecting unit 27 decreases. As a result, the incidence detection timing is likely to be unstable, thereby deteriorating the detection accuracy of synchronous detection, and causing a variation in the scanning time of the scanning path.

As shown in FIG. 15, when the synchronous detecting units 26a and 27a are located close to the rotating mirror deflector 23 and the laser source 22, the positions where the synchronous detecting units 26a and 27a are arranged in the optical housing 28 are likely to deform, due to the influence of heat from the rotating mirror deflector 23 and the laser source 22. Therefore, a misalignment of the synchronous detecting units 26a and 27a due to the deforming of the optical housing 28 due to thermal expansion, and a change in timing of detecting the synchronous detecting beam by the synchronous detecting units 26a and 27a due to the misalignment becomes conspicuous.

SUMMARY OF THE INVENTION

It is an object of the present invention to solve at least the problems in the conventional technology.

The optical scanner in an image forming apparatus according to one aspect of the present invention includes a scanning optical system that forms an optical scanning path, a pair of optical detecting units arranged at two positions on the optical scanning path for detecting a write-start position and a write-end position to measure a time for scanning from the write-start position to the write-end position, and an optical housing that houses at least the scanning optical system and the optical detecting units. The optical detecting units are mounted on the optical housing via an intermediate member having a thermal expansion coefficient smaller than that of the optical housing.

The optical scanner in an image forming apparatus according to another aspect of the present invention includes a laser source that emits a laser beam, a rotating mirror deflector that deflects the laser beam, a scanning optical system that forms an optical scanning path for scanning a peripheral surface of an image carrier with the laser beam deflected by the rotating mirror deflector, an optical detecting unit that detects a synchronous detecting beam that is a part of the laser beam deflected by the rotating mirror deflector, and an optical housing that houses at least the laser source, the rotating mirror deflector, the scanning optical system, and the optical detecting unit. The optical detecting unit is arranged at a position on an optical path of the synchronous detecting beam in such a way that a direction of a displacement of the optical detecting unit resulting from a deforming of the optical housing due to a thermal expansion is on the optical path of the synchronous detecting beam.

The optical scanner in a color image forming apparatus according to still another aspect of the present invention includes a plurality of laser sources that emits a plurality of laser beams, a rotating mirror deflector that deflects the laser beams, a plurality of scanning optical systems that forms a plurality of scanning paths for each of the laser beams deflected by the rotating mirror deflector, an optical housing that houses at least the laser sources, the rotating mirror deflector, and the scanning optical systems, and a plurality of optical detecting units that is mounted on the optical housing at positions where a part of each of the laser beams deflected by the rotating mirror deflector is irradiated. A distance between each of the optical detecting units and a center of the rotating mirror deflector is set substantially same.

The image forming apparatus according to still another aspect of the present invention includes an optical scanner that includes a scanning optical system that forms an optical scanning path, a pair of optical detecting units arranged at two positions on the optical scanning path for detecting a write-start position and a write-end position to measure a time for scanning from the write-start position to the write-end position, and an optical housing that houses at least the scanning optical system and the optical detecting units, an image forming unit that includes an image carrier, forms a toner image by developing an electrostatic latent image written on the image carrier with a toner, and transfers the toner image onto a recording medium, and a fixing unit that fixes the toner image transferred on the recording medium. The optical detecting units are mounted on the optical housing via an intermediate member having a thermal expansion coefficient smaller than that of the optical housing;

The image forming apparatus according to still another aspect of the present invention includes an optical scanner that includes a laser source that emits a laser beam, a rotating mirror deflector that deflects the laser beam, a scanning optical system that forms an optical scanning path for scanning a peripheral surface of an image carrier with the laser beam deflected by the rotating mirror deflector, an optical detecting unit that detects a synchronous detecting beam that is a part of the laser beam deflected by the rotating mirror deflector, and an optical housing that houses at least the laser source, the rotating mirror deflector, the scanning optical system, and the optical detecting unit, an image forming unit that includes an image carrier, forms a toner image by developing an electrostatic latent image written on the image carrier with a toner, and transfers the toner image onto a recording medium, and a fixing unit that fixes the toner image transferred on the recording medium. The optical detecting unit is arranged at a position on an optical path of the synchronous detecting beam in such a way that a direction of a displacement of the optical detecting unit resulting from a deforming of the optical housing due to a thermal expansion is on the optical path of the synchronous detecting beam The image forming apparatus according to still another aspect of the present invention includes an optical scanner that includes a plurality of laser sources that emits a plurality of laser beams, a rotating mirror deflector that deflects the laser beams, a plurality of scanning optical systems that forms a plurality of scanning paths for each of the laser beams deflected by the rotating mirror deflector, an optical housing that houses at least the laser sources, the rotating mirror deflector, and the scanning optical systems, and a plurality of optical detecting units that is mounted on the optical housing at positions where a part of each of the laser beams deflected by the rotating mirror deflector is irradiated, wherein a distance between each of the optical detecting units and a center of the rotating mirror deflector is set substantially same, an image forming unit that includes an image carrier, forms a toner image by developing an electrostatic latent image written on the image carrier with a toner, and transfers the toner image onto a recording medium, and a fixing unit that fixes the toner image transferred on the recording medium. The optical detecting unit is arranged at a position on an optical path of the synchronous detecting beam in such a way that a direction of a displacement of the optical detecting unit resulting from a deforming of the optical housing due to a thermal expansion is on the optical path of the synchronous detecting beam The other objects, features and advantages of the present invention are specifically set forth in or will become apparent from the following detailed descriptions of the invention when read in conjunction with the accompanying drawings.

DETAILED DESCRIPTIONS

Exemplary embodiments of an optical scanner and an image forming apparatus according to the present invention are explained in detail with reference to the accompanying drawings.

Figure 1:
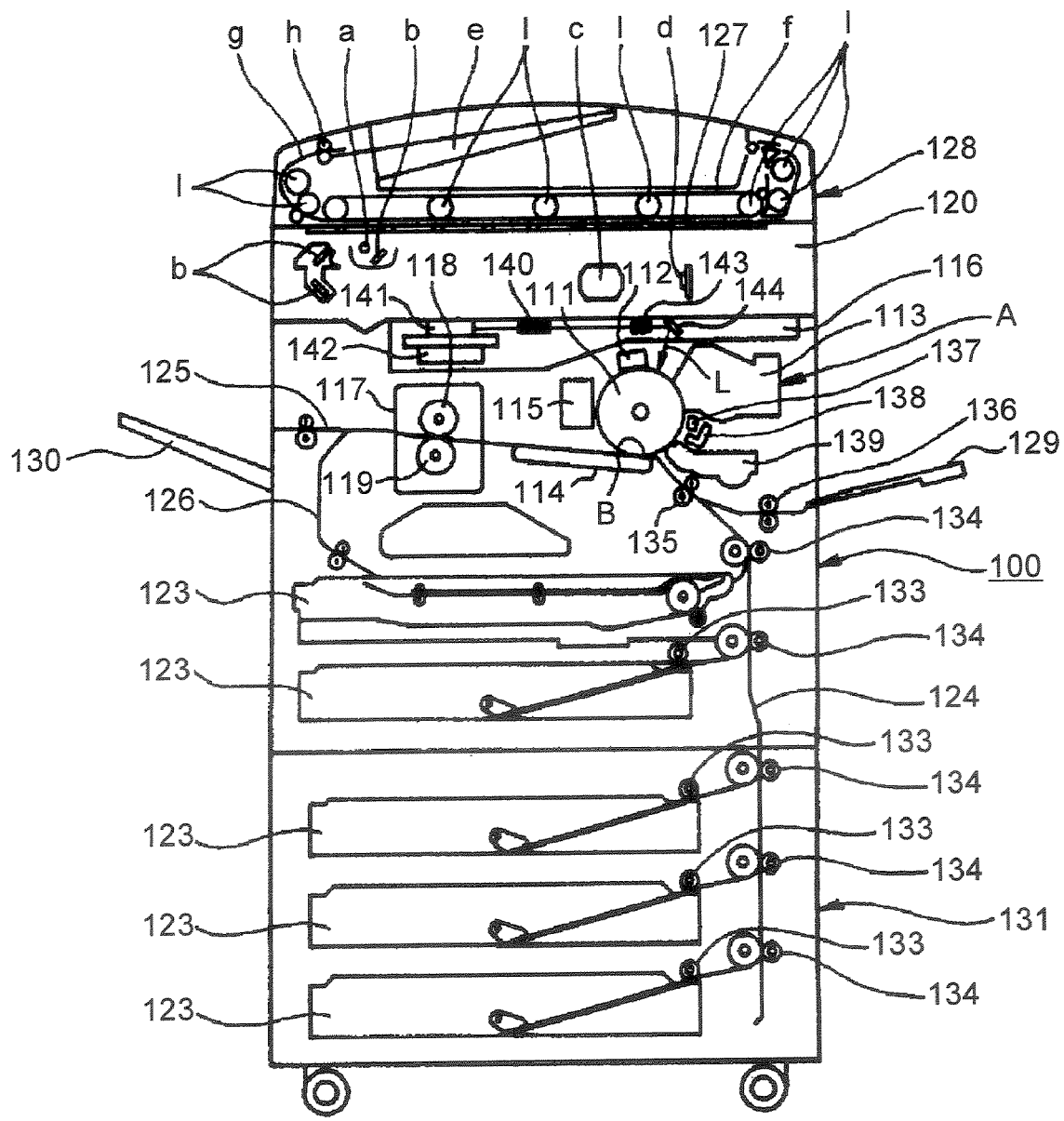
FIG. 1 is a schematic diagram of a black and red two-color laser copying machine according to a first embodiment of the present invention.

The overall configuration of the internal mechanism of a laser copying machine (image forming apparatus) according to a first embodiment of the present invention is shown in FIG. 1. The laser copying machine according to the first embodiment is a black and red two-color laser copying machine having an optical scanner.

Reference sign 100 in the figure denotes a copying machine. The copying main unit 100 is placed on a medium housing table 131. An automatic document feeder (ADF) is mounted on the main unit 100, so as to be freely opened or closed.

A drum-shape photosensitive member (image carrier) 111, being an image carrier, is provided in the copying main unit 100, and a first charging device 112, first development apparatus 113, a second charging device 137, a second writing device 138, second development apparatus 139, a transfer and feed device 114, and a cleaning device 115 are arranged around the photosensitive member 111.

A first writing device 116, being the optical scanner according to the present invention, is provided above these. The first writing device 116 includes, in the optical housing, optical parts such as a light source (not shown), an optical system 140, a polygon scanner unit having a polygon mirror 141 and a polygon motor 142, a scanning optical system 143, and a mirror 144.

Imaging apparatus A is constituted of the photosensitive member 111 and these devices 112 to 116, and 137 to 139. On the left side in the figure of the cleaning device 115 in the imaging apparatus A, fixing unit 117 is provided parallel with the photosensitive member 111. The fixing unit 117 has a fixing roller 118 having a built-in heater, being a heat source, and a pressure roller 119 that presses against the fixing roller 118 from below.

A document reader 120 is provided in the upper part of the main unit 100. The document reader 120 includes a light source "a", a plurality of mirrors "b", an imaging lens "c", and an image sensor "d" such as a charge coupled device (CCD).

On the other hand, a dual side printing unit 122 and a cartridge 123 are vertically provided in two tiers, in the lower part of the main unit 100. From the dual side printing unit 122 and the cartridge 123, a transport line leading to a feed line 124 extending to a transfer position B below the photosensitive member 111 is respectively provided. An inversion path 126 leading to the dual side printing unit 112 is formed by branching from a discharge line 125 extending from the outlet of the fixing unit 117.

On the right side of the main unit 100 shown in FIG. 1, a manual feed tray 129 that guides a manually fed recording medium to the feed line 124 is provided so as to be freely opened or closed. On the other hand, a stack tray 130 that receives the recording medium discharged through a discharge line 125 is provided on the left side of the main unit 100.

A contact glass 127 is placed on the upper face of the main unit 100. The auto document feeder 128 is attached on the main unit 100, so as to cover the contact glass 127.

The auto document feeder 128 includes an original table e on which an original document is placed, a paper catch table f on which the read document is placed, a document feed path g from the original table e to the paper catch table f, a document feed roller h for sending out the document on the original table e, and a plurality of document feed rollers i that feeds the document on the document feed path g.

A cartridge 123 similar to the one described above is provided in multiple tiers, in the medium storage table 131 on which the main unit 100 is placed.

When a copy is made by using the laser copying machine shown in FIG. 1, a main switch (not shown) is turned on, and an original document is set on the original table e in the automatic document feeder 128. Alternatively, after the automatic document feeder 128 is opened to set the original document directly on the contact glass 127, the automatic document feeder 128 is closed to press the document thereby.

When a start switch is pressed, when the document is set in the automatic document feeder 128, the document set on the original table e shown in FIG. 1 is put into the document feed path g by the document feed roller h, to feed the document by the document carrier feed i, so as to shift the document onto the contact glass 127. The document reader 120 is then driven, to read the content on the document by color, and the document is discharged onto the paper catch table f. On the other hand, when the document is set on the contact glass 127 beforehand, the document reader 120 is immediately driven, to read the document by color. The content on the document read by color is converted into a black and red electric digital image signal.

At this time, in the imaging apparatus A, the photosensitive member 111 is rotated clockwise in the figure, and the surface thereof is uniformly charged by the first charging device 112, then laser beams L are irradiated based on the black digital image signal, corresponding to the read content read by the document reader 120, to perform write with black by the first writing device 116, to thereby form an electrostatic latent image on the surface of the photosensitive member 111. Thereafter, the black toner is adhered thereon by the first development apparatus 113, to thereby form a black toner image by visualizing the electrostatic latent image.

Subsequently, the surface of the photosensitive member 111 is uniformly charged by the second charging device 137, then laser beams are irradiated based on the red digital image signal, corresponding to the read content read by the document reader 120, to perform write with red by the second writing device 138, to thereby form an electrostatic latent image corresponding to the red component of the color document, superposed on the black toner image. Thereafter, the red toner is adhered thereon by the second development apparatus 139, to thereby form a red toner image by visualizing the electrostatic latent image. As a result, a two-color toner image including the black toner image and the red toner image is formed on the photosensitive member 111.

When the start switch is pressed, a corresponding cartridge 123, which loads recording media such as paper or OHP transparencies, is appropriately selected from a plurality of cartridges 123 provided in multiple tiers in the main unit 100 and the medium storage table 131. The recording medium is sent out by rotating a delivery roller 133 in the cartridge 123, to put the recording medium in the feed line 124 so as to carry the recording medium by a feed roller 134, and stop the recording medium by bumping it against a resist roller 135. The resist roller 135 is then rotated at a timing matched with the rotation of the photosensitive member 111, to feed the recording medium to below the photosensitive member 111.

Alternatively, a feed roller 136 in a manual feed unit is rotated, to feed the manually fed recording medium set on the opened manual feed tray 129 into the feed line 124, and stop the recording medium by bumping it against the resist roller 135, in the same manner The recording medium is fed to below the photosensitive member 111, at a timing matched with the rotation of the photosensitive member 111.

A transfer image is formed on the recording medium sent to below the photosensitive member 111 by transferring the two toner images at a transfer position B in the transfer and feed device 114. The residual toner on the surface of the photosensitive member 111 after the transfer image has been formed thereon is removed by the cleaning device 115, so that the photosensitive member 111 is ready for the next image forming.

On the other hand, the recording medium after the transfer image has been formed thereon is fed by the transfer and feed device 114 to be sent to the fixing unit 117, where heat and pressure are applied thereto by the fixing roller 118 and the pressure roller 119, to fix the transfer image. Thereafter the recording medium is made to pass through the discharge path 125 and discharged onto the discharge tray 130.

When an image is recorded on both sides of the recording medium, the recording medium is sent from the discharge path 125 to the inversion path 126, to be inverted in the dual side printing unit 122, to be put again into the feed line 124, so that the toner image formed on the photosensitive member 111 separately is transferred onto the backside of the recording medium, to form the transfer image. Thereafter, the transfer image is fixed by the fixing unit 117 and the recording medium is discharged onto the discharge tray 130.

Figure 2:
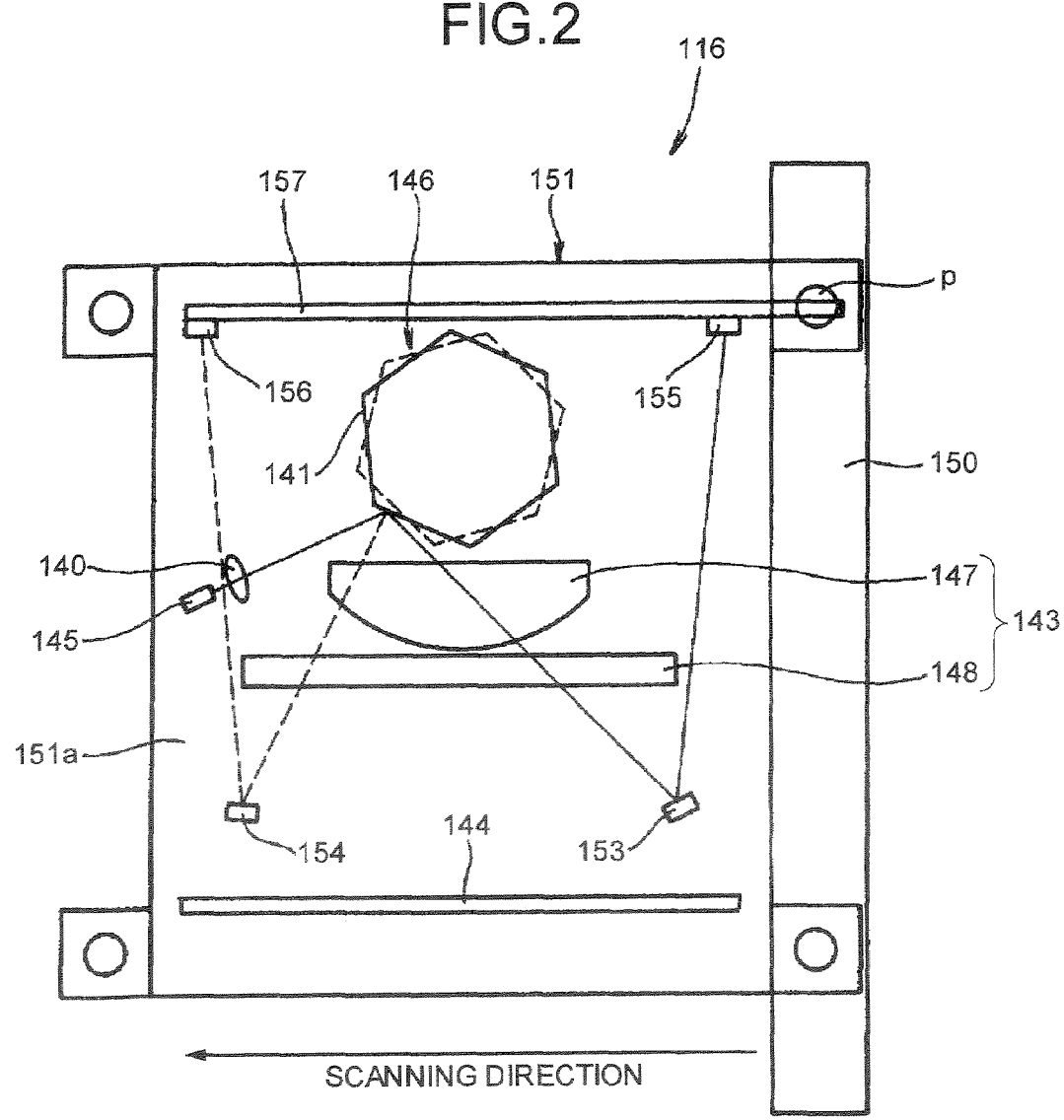
FIG. 2 is a schematic diagram of a first writing device as an optical scanner according to the first embodiment.

FIG. 2 is a schematic diagram of a first writing device 116 as an optical scanner according to the first embodiment.

Reference sign 150 is a frame (a part on the image forming apparatus side) provided in the copying main unit 100). An optical housing 151 is fixed by screwing to the frame 150 at a position p. In the optical housing 151, optical parts such as the light source 145, the optical system 140, the polygon scanner unit 146 having the polygon mirror 141 with mirrors on the sides of a regular polygon and the polygon motor 142 for rotating the polygon mirror at a high speed, the scanning optical system 143, and the mirror 144 are provided as described above, fitted to, for example, a resin base member 151a, to thereby form an optical scanning path.

The laser beams from the light source 145 such as a laser diode are shaped by the optical system 140 including a collimate lens, an aperture, and the like, guided to the polygon scanner unit 146, reflected by the polygon mirror 141 rotated by the polygon motor 142 to perform deflection scanning. The isometric scanning by the polygon mirror 141 is changed to uniform straight-line scanning by an fθ lens 147 constituting the scanning optical system 143. After an optical face tangle error by the polygon mirror 141 is corrected by a facet error correction lens (Bioptic Telescopic Lens: BTL) also constituting the scanning optical system 143, the laser beams are reflected by the mirror 144 and guided to the photosensitive member 111.

In the first writing device 116, mirrors 153 and 154 are provided outside the effective exposure area of the scanning beams from the polygon scanner unit 146, to reflect the scanning beams, and guide the beams to optical detecting units 155 and 156 respectively. The pair of optical detecting units 155 and 156 is fixed on the base member 151a of the optical housing 151, via an intermediate member 157, and arranged at the write state position and the write-end position outside the image area on the optical scanning path, so as to detect laser beams guided by the mirrors 153 and 154 and measure the scanning time from the write state position to the write-end position.

The intermediate member 157 has a smaller thermal expansion coefficient than that of the base member 151a of the optical housing 151. The intermediate member 157 fixes the optical housing 151 at the position p by co-fastening the write state position side to the optical housing 151, using a fitting such as a fixing screw for fixing the optical housing 151 to the frame 150, being a part on the copying main unit 100 side.

As a result, the influence of thermal deforming of the optical housing 151 can be completely ignored, and a position change of the optical detecting units 155 and 156 can be reduced. Further, by fixing the write-start position side of the intermediate member 157 to the optical housing 151, the influence of thermal deforming can be reduced, and a misalignment of the write-start position at the time of starting write can be reduced.

If the intermediate member 157 cannot be fixed at the mounting location of the optical housing 151, which is fixed to the frame 150, the write-start position side of the intermediate member 157 may be fixed to a portion where the thermal deforming of the base member 151a is smallest. As a result, the influence by the thermal deforming can be reduced, and a position change of the optical detecting units 155 and 156 can be reduced.

The optical detecting unit 155 on the write-start position side first detects the scanning beam, and the optical detecting unit 156 on the write-end position side then detects the scanning beam. The scanning time for scanning one line is measured from these detection results, and the variation quantity from the aimed horizontal scanning magnification is calculated from the measurement result, to thereby correct the horizontal scanning magnification error by changing the write clock frequency from the calculation result.

Figure 3:
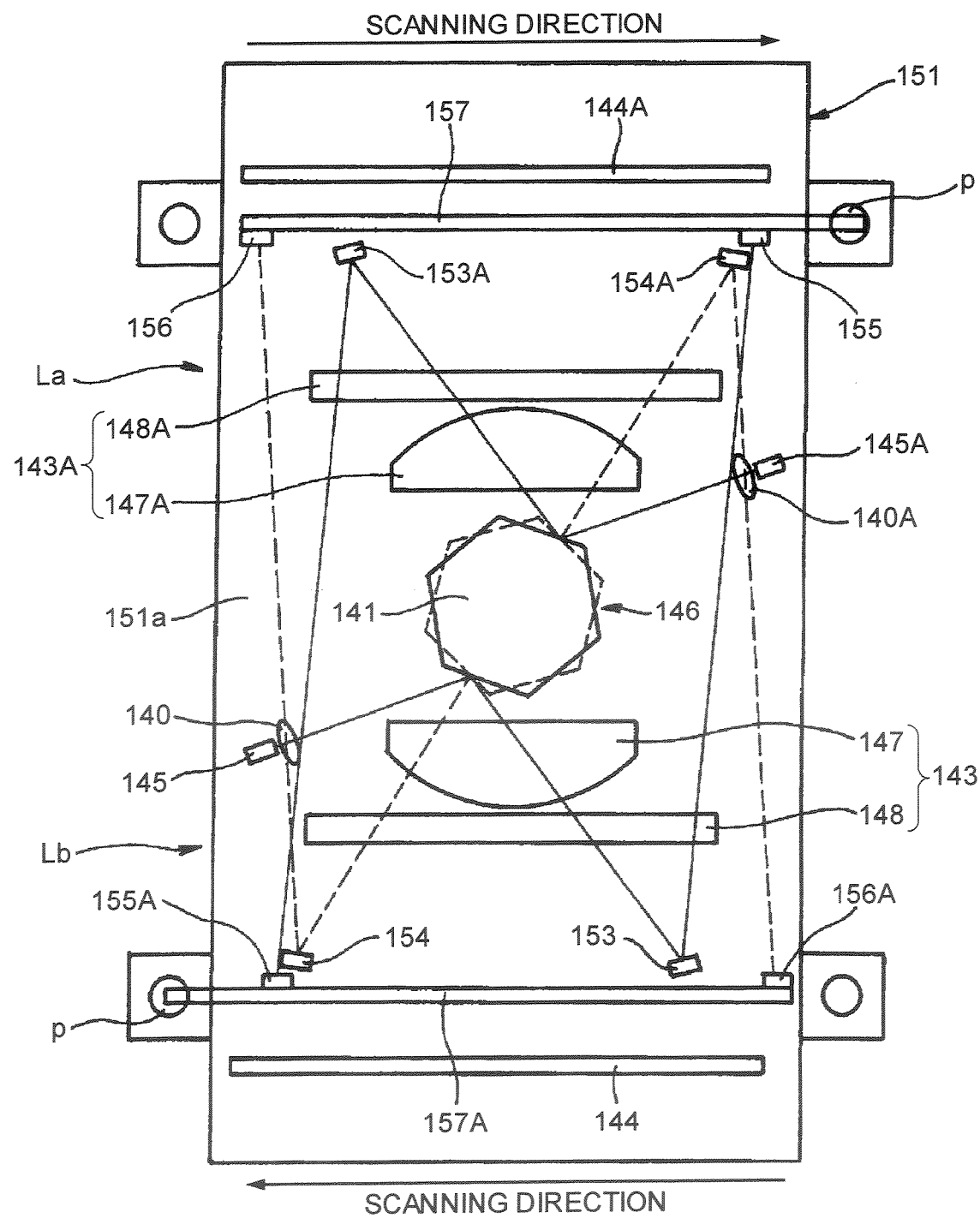
FIG. 3 is a schematic diagram of an optical scanner having a plurality of scanning paths.

FIG. 3 is a schematic diagram of an optical scanner having another optical scanning path Lb together with the optical scanning path La as described above, to thereby form two optical scanning paths.

In the another optical scanning path Lb, the laser beams from a light source 145A such as a laser diode are shaped by an optical system 140A, guided to the polygon scanner unit 146, reflected by the polygon mirror 141 rotated by the polygon motor 142 to perform deflection scanning. The isometric scanning by the polygon mirror 141 is changed to uniform straight-line scanning by an fθ lens 147A constituting a scanning optical system 143A. After an optical face tangle error by the polygon mirror 141 is corrected by a facet error correction lens (BTL) 148A also constituting the scanning optical system 143A, the laser beams are reflected by a mirror 144A and guided to the photosensitive member 111.

Mirrors 153A and 154A are provided outside the effective exposure area of the scanning beams from the polygon scanner unit 146, to reflect the scanning beams, and guide the beams to optical detecting units 155A, 156A respectively. The pair of optical detecting units 155A and 156A is fixed on the base member 151a of the optical housing 151, via an intermediate member 157A.

In the two optical scanning paths La and Lb, the thermal expansion coefficient of the intermediate members 157 and 157A is made different from each other, corresponding to the heat distribution in the optical housing 151. For example, from the positional relation of heat source in the image forming apparatus, when the thermal deforming at the fixed position of the intermediate member 157A is larger than that at the fixed position of the intermediate member 157, the thermal expansion coefficient of the intermediate member 157A is made smaller than that of the intermediate member 157.

As a result, even when the thermal deforming is not uniform in various parts of the optical housing 151, adjustment is performed by making the thermal expansion coefficient of the intermediate members 157 and 157A different from each other corresponding thereto, so that a misalignment between the optical scanning paths La and Lb can be decreased. In the case of color image forming apparatus, out-of-color registration can be prevented.

Figure 4:
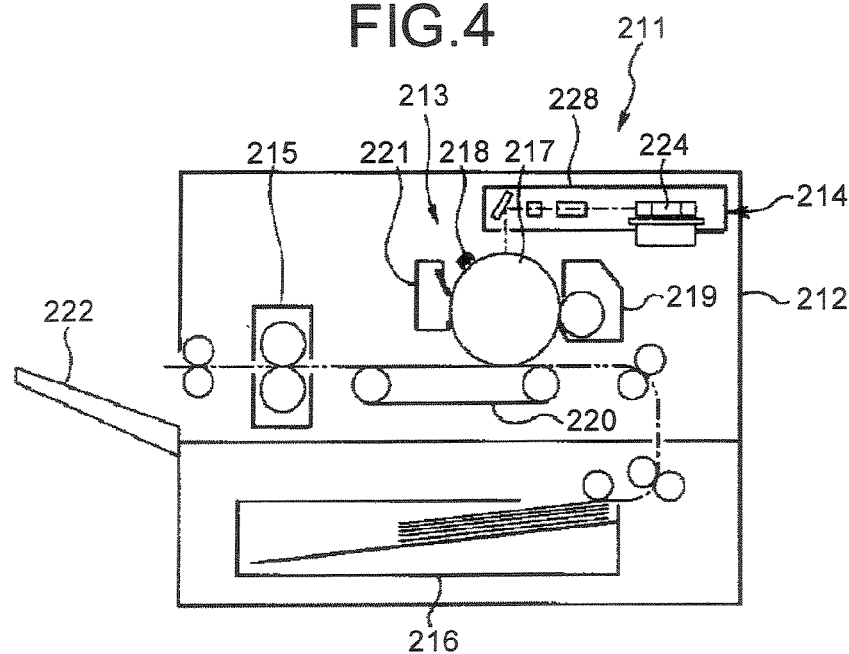
FIG. 4 is a schematic diagram of a laser printer according to a second embodiment of the present invention.

A second embodiment of the present invention is explained with reference FIGS. 4 to 8. FIG. 4 is a schematic diagram of a laser printer, being the image forming apparatus according to the second embodiment. In the apparatus 212 of the laser printer 211, an image forming unit 213, an optical writing device (optical scanner) 214, a fixing unit 215, a paper feed cassette 216, and the like are arranged.

The image forming unit 213 includes a drum-shaped photosensitive member 217, being an image carrier, and a charger 218, a developing device 219, a transfer device 220, and a cleaning device 221 arranged around the photosensitive member 217 in the order of image forming process. The outer surface of the photosensitive member 217 is uniformly charged by the charger 218, and the charged peripheral surface of the photosensitive member 217 is scanned by scanning paths from the optical writing device 214, to form an electrostatic latent image on the peripheral surface of the photosensitive member 217. The electrostatic latent image is developed by a toner in the developing device 219, to form a toner image. The toner image is transferred onto a recording medium S fed and fed from the paper feed cassette 216 by the transfer device 220. The toner image transferred onto the recording medium S is fixed, when the recording medium S is fed through the fixing unit 215, and the recording medium S on which the toner image is fixed is discharged on a discharge tray 222.

The optical writing device 214 has basically the same configuration as that of the conventional optical writing devices 21 and 21a explained with reference to FIGS. 12 to 15. That is, the optical writing device 214 includes a laser source 223 that emits laser beams, a rotating mirror deflector 224 rotated about the center of rotation to deflect the laser beams emitted from the laser source 223, a scanning optical system 225 that forms a scanning path for scanning the peripheral surface of the photosensitive member 217, from the laser beams deflected by the rotating mirror deflector 224, synchronous detecting units (optical detecting units) 226 and 227, from which a part of the laser beams deflected by the rotating mirror deflector 224 is irradiated as a synchronous detecting beam, and an optical housing 228 that houses and holds the laser source 223, the rotating mirror deflector 224, the scanning optical system 225, and the synchronous detecting units 226 and 227. The scanning optical system 225 includes lenses 225a and 225b, and a reflection mirror 225c.

In the optical writing device 214 having such a configuration, the laser beams emitted from the laser source 223 are deflected by the rotating mirror deflector 224 rotated at a high speed, and the scanning path is formed from the deflected laser beams by the scanning optical system 225. This scanning path scans the peripheral surface of the photosensitive member 217, to thereby form an electrostatic latent image on the peripheral surface of the photosensitive member 217. A part of the laser beams deflected by the rotating mirror deflector 224 is detected as the synchronous detecting beam by the synchronous detecting units 226 and 227. Based on the detection result, the scanning start timing and the scanning end timing of the scanning path are planned.

Figure 6:
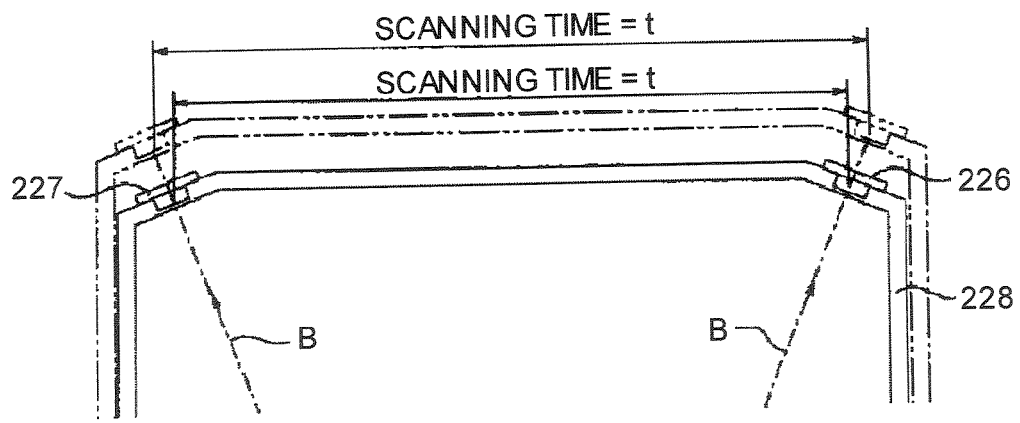
FIG. 6 depicts that a detection timing of synchronous detecting beams by synchronous detecting units is constant even when an optical housing in the optical writing device is deformed due to a thermal expansion.

The characteristic portion in this embodiment will be explained sequentially. The synchronous detecting units 226 and 227 are respectively arranged at a position where the displacement direction of the synchronous detecting units 226 and 227 resulting from the deforming of the optical housing 228 due to thermal expansion is on the optical axis of the synchronous detecting beam "B". Therefore, as shown in FIG. 6, even when the optical housing 228 deforms from the position indicated by the actual line to the position indicated by the broken line due to thermal expansion, the synchronous detecting units 226 and 227 are located on the optical axis of the synchronous detecting beam "B". As a result, even when the optical housing 228 deforms due to thermal expansion, the detection timing of the synchronous detecting beam "B" by the synchronous detecting units 226 and 227 can be kept constant, and hence the scanning time "t" of the scanning path for scanning the photosensitive member 217 becomes constant. As a result, the write position (scanning start position and scanning end position) of the electrostatic latent image by the scanning path on the photosensitive member 217 is kept constant, thereby enabling image forming without a magnification error.

Figure 7:
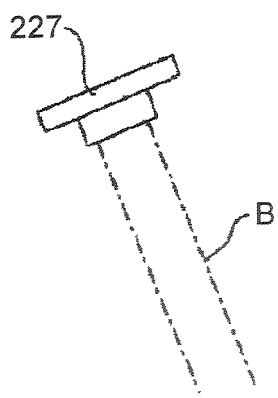
FIG. 7 depicts that the synchronous detecting unit is arranged in such a way that a detecting surface of the synchronous detecting unit is normal to an optical path of the synchronous detecting beam.

As shown in FIG. 7, the synchronous detecting units 226 and 227 are arranged in the direction substantially orthogonal to the direction of optical path of the synchronous detecting beam "B". Therefore, even when the optical housing 228 deforms due to thermal expansion, and the synchronous detecting units 226 and 227 deform resulting from the deforming of the optical housing 228, the synchronous detecting beam "B" is made to enter in the direction substantially orthogonal to the synchronous detecting units 226 and 227. As a result, the light quantity per unit area of the synchronous detecting beam "B" on the synchronous detecting units 226 and 227 becomes sufficient, and the timing for detecting the incidence of the synchronous detecting beam "B" in the synchronous detecting units 226 and 227 becomes stable, and the write position of the electrostatic latent image on the photosensitive member 217 by the scanning path is kept constant.

Figure 5:
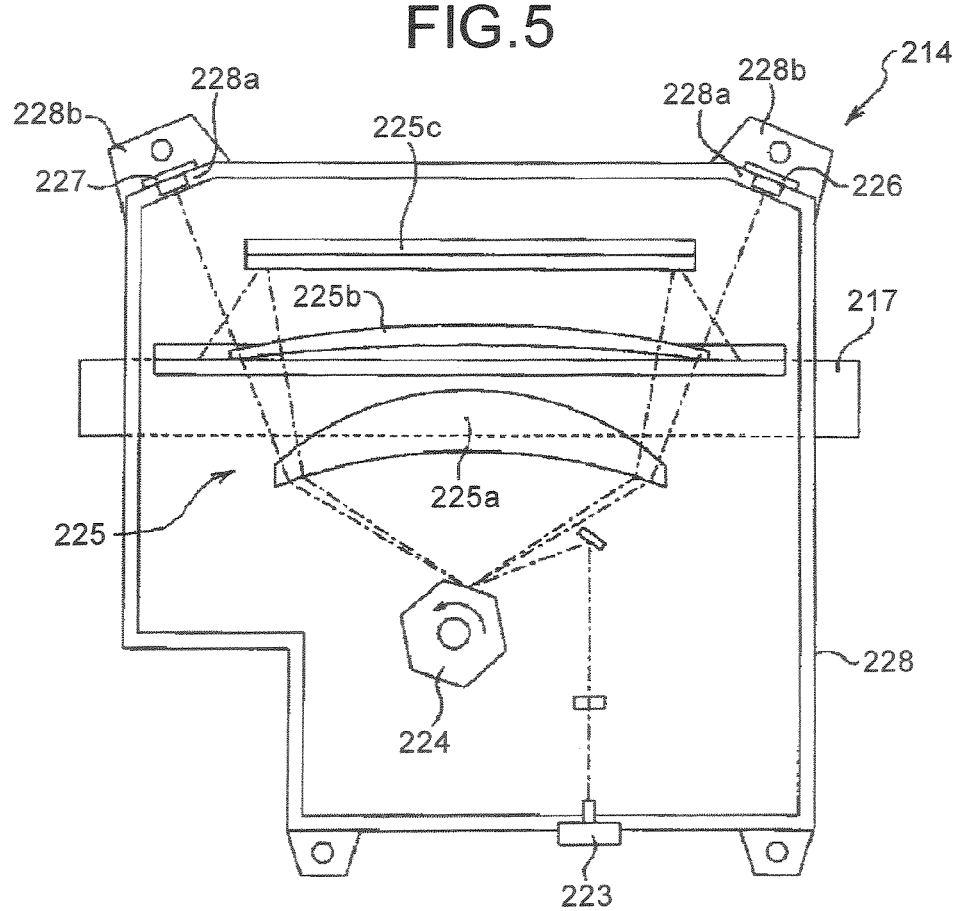
FIG. 5 is a schematic diagram of an optical writing device as an optical scanner according to the second embodiment.

As shown in FIG. 5, the synchronous detecting units 226 and 227 are arranged opposite to the rotating mirror deflector 224, with the scanning optical system 225 put therebetween. Therefore, the location where the synchronous detecting units 226 and 227 are arranged in the optical housing 228 is a position away from the rotating mirror deflector 224. As a result, deforming due to the heat from the rotating mirror deflector 224 decreases, a displacement magnitude of the synchronous detecting units 226 and 227 resulting from the deforming also decreases, and hence the detection timing of the synchronous detecting beam "B" by the synchronous detecting units 226 and 227 can be kept constant.

As shown in FIG. 5, the synchronous detecting units 226 and 227 are arranged opposite to the rotating mirror deflector 224, with the scanning optical system 225 put therebetween. Therefore, the location where the synchronous detecting units 226 and 227 are arranged in the optical housing 228 is a position away from the laser source 223. As a result, deforming due to the heat from the laser source 223 decreases, a displacement magnitude of the synchronous detecting units 226 and 227 resulting from the deforming also decreases, and hence the detection timing of the synchronous detecting beam "B" by the synchronous detecting units 226 and 227 can be kept constant.

Figure 8:
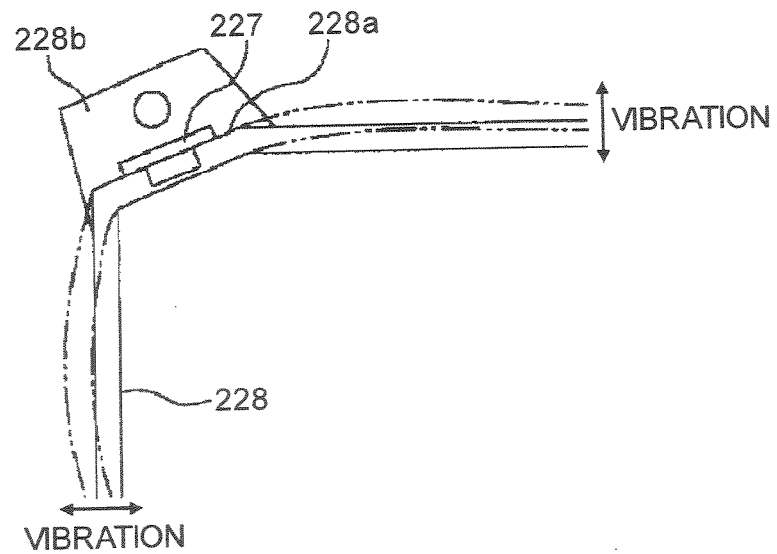
FIG. 8 depicts that the synchronous detecting unit is arranged at a corner in the optical housing and near a fastening portion for fixing the optical writing device to the apparatus.

As shown in FIGS. 5 and 8, the synchronous detecting units 226 and 227 are respectively arranged at the corner 228a of the optical housing 228. The corner 228a in the optical housing 228 corresponds to a so-called a joint in a structure, and hence the strength thereof is higher than that of other portions, that is, the central part of the structure. Accordingly, even when vibrations occurring due to rotation of the rotating mirror deflector 224, and vibrations from the driving unit in the apparatus 212 in which the optical writing device 214 is fixed are transmitted thereto, the corners 228a where the synchronous detecting units 226 and 227 are arranged are unlikely to vibrate, thereby suppressing a difference in the detection timing of the synchronous detecting beam "B" due to the vibration of the synchronous detecting units 226 and 227. As a result, the detection timing of the synchronous detecting beam "B" by the synchronous detecting units 226 and 227 can be kept constant, and the write position of the electrostatic latent image on the photosensitive member 217 by the scanning path can be kept constant.

As shown in FIGS. 5 and 8, the synchronous detecting units 226 and 227 are respectively arranged close to the fastening portion 228b in the optical housing, where the optical housing 228 is fixed to the apparatus 212. The fastening portion 228b where the optical housing 228 is fixed to the apparatus 212 becomes a fixed end when the optical housing 228 vibrates. Therefore, as shown in FIG. 8, eve when the optical housing 228 vibrates, vibrations of the synchronous detecting units 226 and 227 arranged close to the fastening portion 228b can be suppressed, thereby suppressing a difference in the detection timing of the synchronous detecting beam "B" due to vibrations of the synchronous detecting units 226 and 227. As a result, the detection timing of the synchronous detecting beam "B" by the synchronous detecting units 226 and 227 can be kept constant, and the write position of the electrostatic latent image on the photosensitive member 217 by the scanning path can be kept constant.

Further, the optical housing 228 is formed of resin. Therefore, even when the optical housing 228 deforms due to thermal expansion, the detection timing of the synchronous detecting beam "B" by the synchronous detecting units 226 and 227 can be kept constant, to suppress a difference in the detection timing of the synchronous detecting beam "B" due to the influence of vibrations. As a result, a cheap resin can be used as the member for the optical housing 228, thereby enabling reduction of the manufacturing cost of the optical housing 228.

Figure 9:
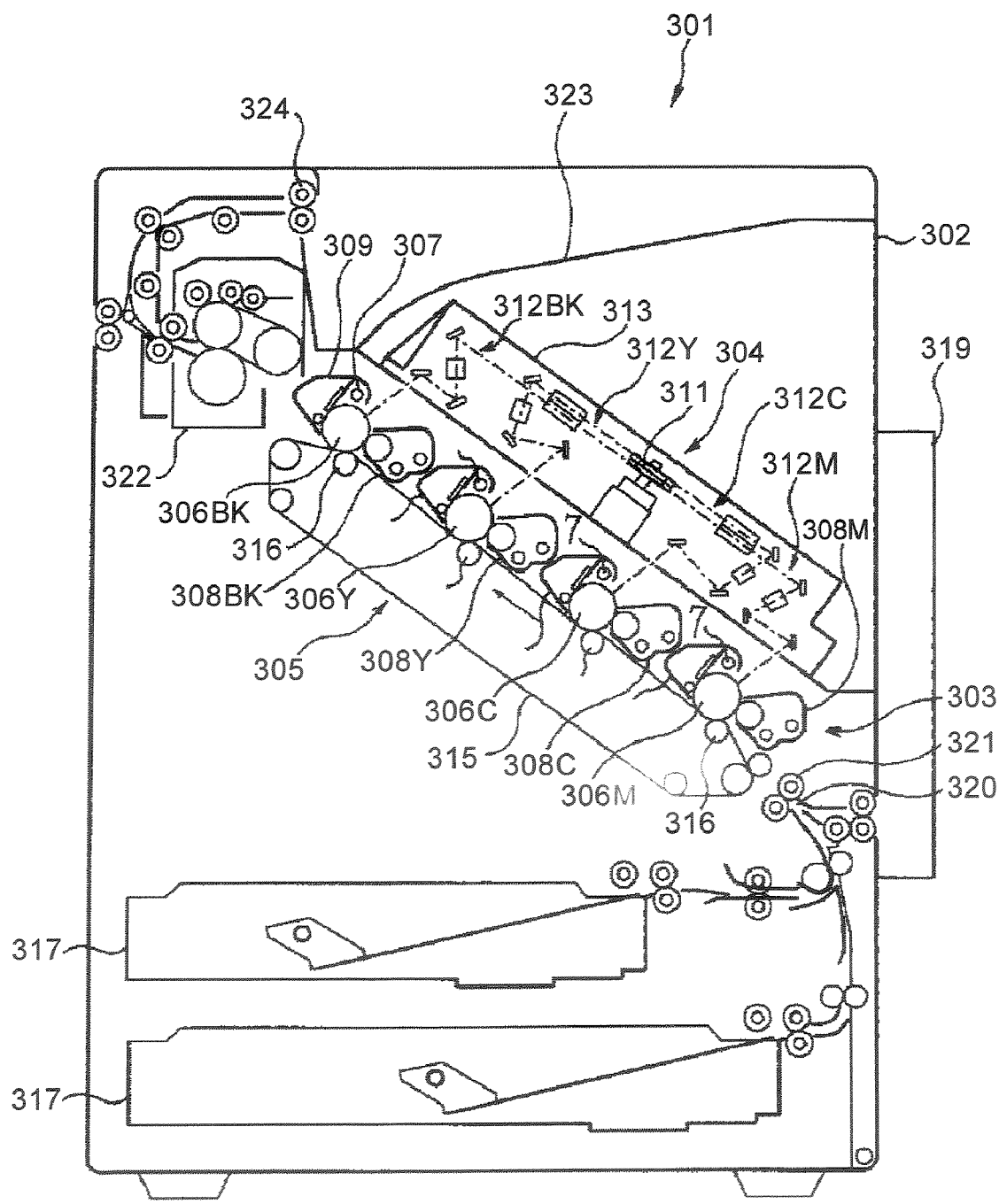
FIG. 9 is a schematic diagram of an image forming apparatus according to a third embodiment of the present invention.
Figure 10:
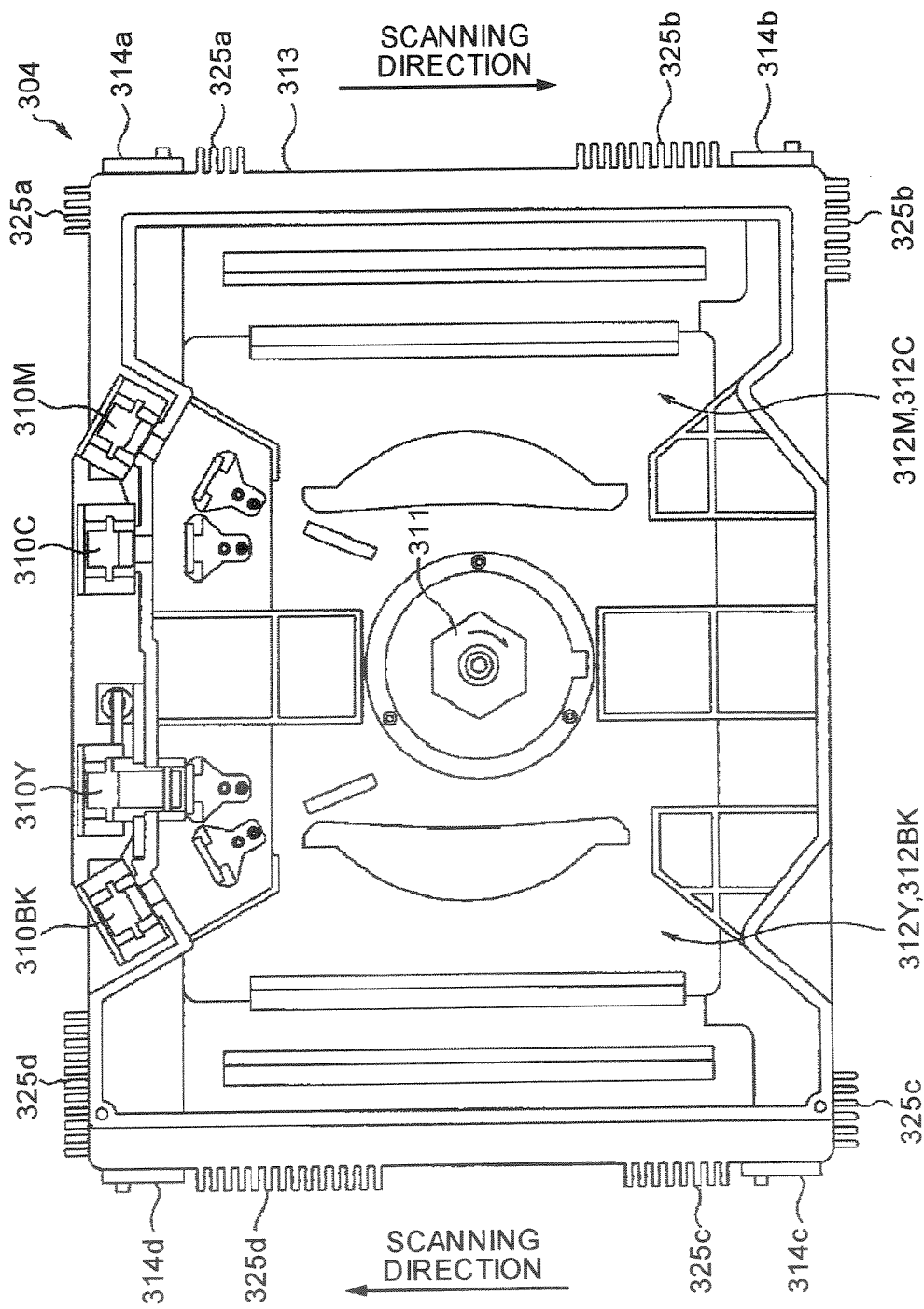
FIG. 10 is a schematic diagram of an optical writing device as an optical scanner according to the third embodiment.
Figure 11A:
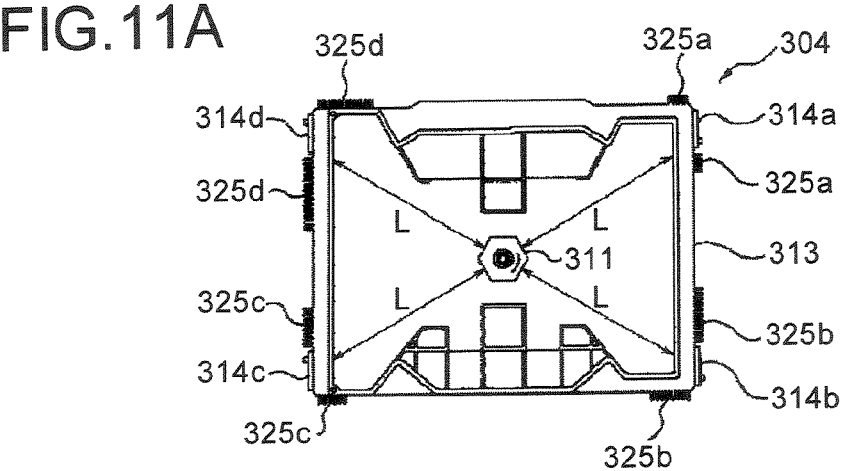
FIG. 11A to FIG. 11C depict that the synchronous detecting units are displaced in same way even when the optical housing thermally expands due to influence of heat.
Figure 11B:
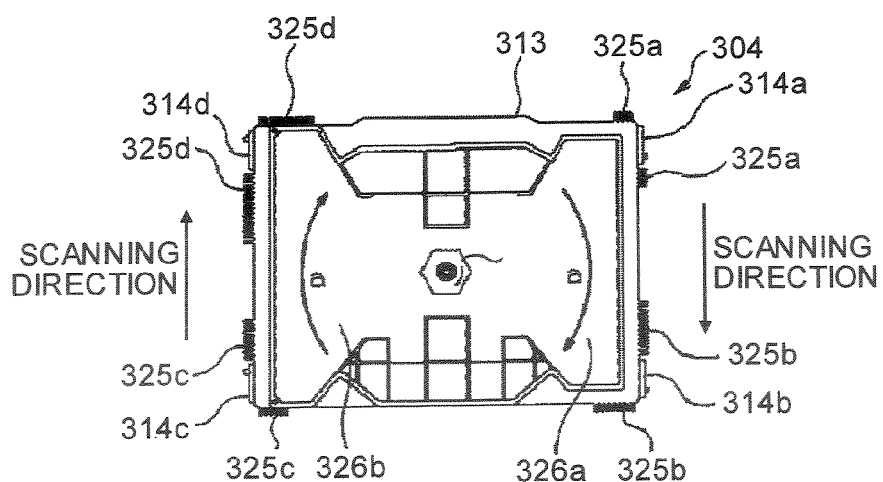
Figure 11C:
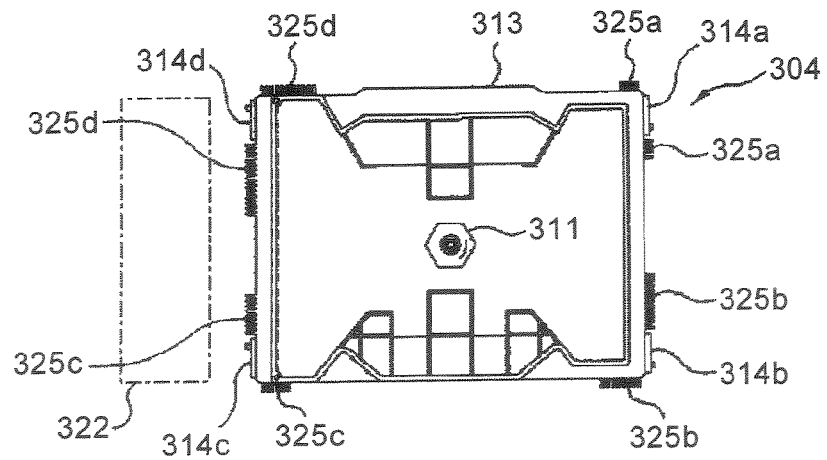
Figure 12:
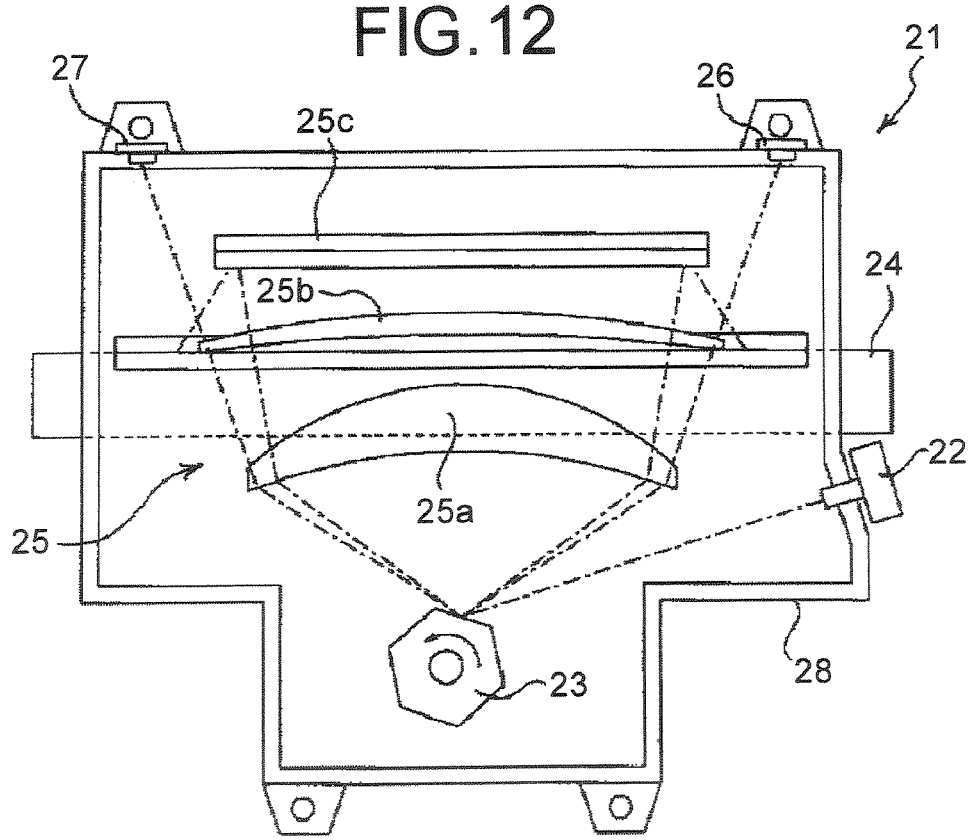
FIG. 12 is a schematic diagram of a conventional optical writing device.
Figure 13:
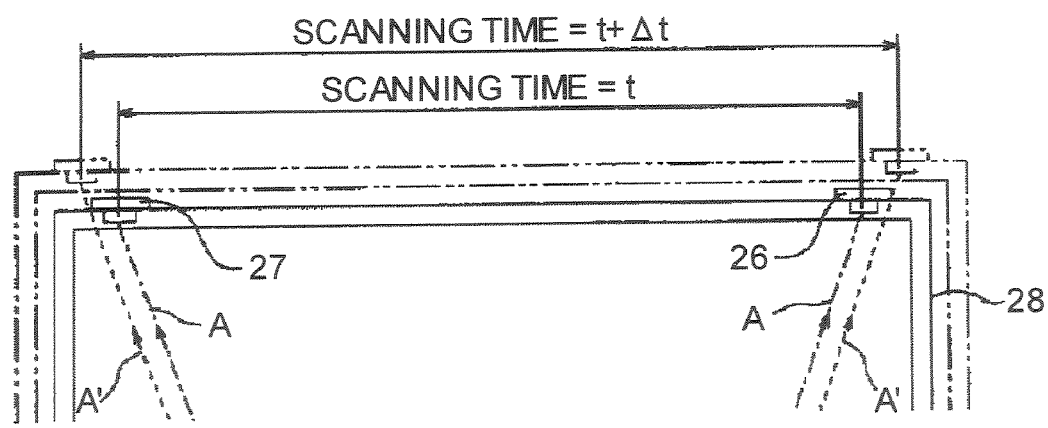
FIG. 13 is depicts that the detection timing of the synchronous detecting beam by the synchronous detecting unit changes when the optical housing of the conventional optical writing device deforms due to the thermal expansion.
Figure 14:
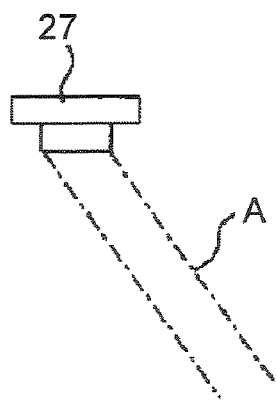
FIG. 14 depicts that the arranged position of the synchronous detecting unit is deviated from a position where the detecting surface of the synchronous detecting unit is normal to an optical path of the synchronous detecting beam.
Figure 15:
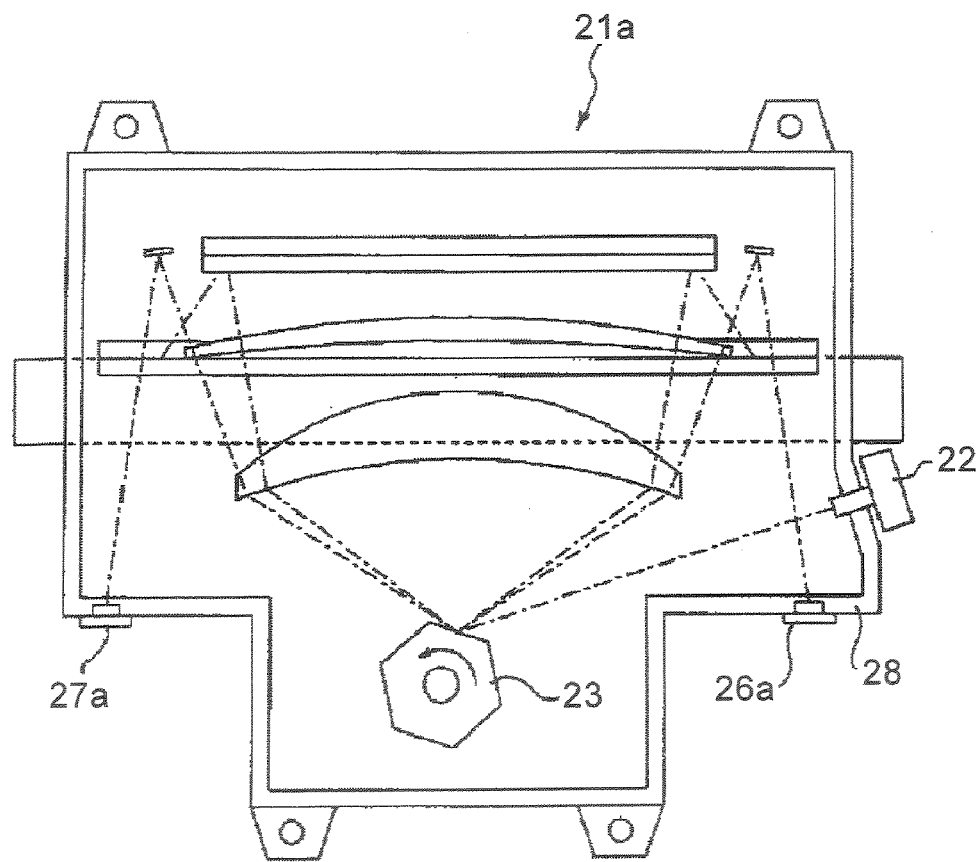
FIG. 15 is a schematic diagram of another conventional optical writing device.

A third embodiment of the present invention is explained with reference to the drawings. FIG. 9 is a schematic diagram of an image forming apparatus according to a third embodiment of the present invention, FIG. 10 is a schematic diagram of an optical writing device as an optical scanner according to the third embodiment, and FIGS. 11A to 11C depict that the synchronous detecting units are displaced in same way even when the optical housing thermally expands due to influence of heat.

As shown in FIG. 9, substantially at the center of the apparatus 302 of a full color printer 301, being the image forming apparatus, an image forming unit 303, an optical writing device 304, and a transfer and feed device 305 are provided.

The image forming unit 303 includes four photosensitive members 306 (306M, 306C, 306Y, 306Bk), being an image carrier, arranged parallel with each other, chargers (charging roller, charging brush, charging charger, and the like) 307, developing devices 308 (308M, 308C, 308Y, 308Bk), and a cleaning device 309, being members for performing image forming by the electrophotographic process, arranged around the photosensitive members 306 in the order of image forming process. Toners of a different color from each other are stored respectively in the developing devices 308 (308M, 308C, 308Y, 308Bk), and due to the color difference of the toners, the toner image formed on the respective photosensitive members 306 (306M, 306C, 306Y, 306Bk) has a different color. The subscripts M, C, Y, and Bk indicate colors of magenta, cyan, yellow, and black. The photosensitive member (image carrier) is not limited to the drum shape, but also a belt shape may be used.

The optical writing device 304 includes four laser sources 310 (310M, 310C, 310Y, 310Bk), one rotating mirror deflector 311 that is rotated about the center of rotation and deflects laser beams emitted from the laser sources 310 (310M, 310C, 310Y, 310Bk), four scanning optical systems 312 (312M, 312C, 312Y, 312Bk) that form scanning paths from the laser beams deflected by the rotating mirror deflector 311, an optical housing 313 that houses and holds these laser sources 310, rotating mirror deflector 311, and scanning optical systems 312, and four synchronous detecting units 314a, 314b, 314c, and 314d located at positions where a part of the laser beams deflected by the rotating mirror deflector 311 is irradiated, and fixed to the optical housing 313.

The respective scanning optical systems 312 (312M, 312C, 312Y, 312Bk) are formed by combining a lens and a reflection mirror, and the like. The uniformly charged photosensitive members 306M, 306C, 306Y, 306Bk are scanned by the scanning path formed by the optical writing device 304, thereby forming an electrostatic latent image on the respective photosensitive members 306M, 306C, 306Y, 306Bk.

The synchronous detecting unit 314a detects the scanning start position of the scanning path of the two scanning optical systems 312M and 312C, and the synchronous detecting unit 314b detects the scanning end position of the scanning path of the two scanning optical systems 312M and 312C. Further, the synchronous detecting unit 314c detects the scanning start position of the scanning path of the two scanning optical systems 312Y and 312Bk, and the synchronous detecting unit 314d detects the scanning end position of the scanning path of the two scanning optical systems 312Y and 312Bk.

The transfer and feed device 305 is a device that feeds a recording medium and transfers the respective color toner images formed by the image forming unit onto the fed recording medium. The transfer and feed device 305 includes a transfer and feed belt 315 rotated in a direction indicated by the arrow for feeding the recording medium, a transfer device (transfer roller, transfer brush and the like) 316 arranged on the backside of the transfer and feed belt 315, and the like.

Paper feed cassettes 317 and 318 are arranged below the transfer and feed device 305 in the apparatus 302, so as to be freely pulled out, and a manual feed tray 319 is provided on the side of the apparatus 302, so as to be freely opened or closed. In the apparatus 302, a feed path 320 is formed, through which the recording medium fed from the paper feed cassettes 317, 318, or the manual feed tray 319 is fed. A resist roller pair 321, an image forming unit 303, a transfer and feed device 305, a fixing unit 322, and a discharge roller 324 that discharges the recording medium having passed through the fixing unit 322 onto a discharge tray 323 are arranged on the feed path 320.

In such a configuration, the basic operation of the full color printer 301 will be explained. At first, an electrostatic latent image is formed on the respective photosensitive members 306M, 306C, 306Y, 306Bk by the operation of the optical writing device 304, and the electrostatic latent image is developed by the toner in the developing devices 308M, 308C, 308Y, 308Bk, respectively, to thereby form a toner image. The toner images on the respective photosensitive members 306M, 306C, 306Y, 306Bk are sequentially transferred onto the recording medium fed by the transfer and feed device 305 and superposed on each other, to thereby form a full color toner image on the recording medium. The transfer paper on which the full color toner image is formed in this manner is subjected to the fixing processing by the fixing unit 322, and discharged onto the discharge tray 323 by the discharge roller 324.

Under such a configuration, the characteristic part in this embodiment will be explained sequentially. The straight distance "L" from the center of rotation of the rotating mirror deflector 311 to the respective synchronous detecting units 314*a*, 314*b*, 314*c*, and 314*d* are set substantially the same (see FIG. 11A).

On the peripheral surface of the optical housing 313, fins 325*a*, 325*b*, 325*c*, and 325*d* are formed, located on the peripheries of the synchronous detecting units 314*a* to 314*d*.

The number of the respective fins 325*a*, 325*b*, 325*c*, and 325*d* is different from each other. Airflow generating spaces 326*a* and 326*b* in which airflow (indicated by arrow "a") is generated around the rotating mirror deflector 311, with the rotation of the rotating mirror deflector 311, are formed in the optical housing 313. These airflow generating spaces 326*a* and 326*b* are not a space divided completely independently, but partly communicate with each other. However, since the gap in the communicating portion is small, airflow is generated independently in the respective airflow generating spaces 326*a* and 326*b*, with the rotation of the rotating mirror deflector 311. The number of fins 325*b* (325*d*) located on the downstream side in the flow direction of the airflow generated in the airflow generating spaces 326*a* and 326*b* is set larger than the number of the fins 325*a* (325*c*) located on the upstream side in the flow direction of the airflow (see FIG. 11B).

The number of fins 325*a* to 325*d* is such that when the optical writing device 304 is fixed at a mounting location in the apparatus 302, the number of fins 325*c* and 325*d* located on the side close to the fixing unit 322, being a heat source, provided in the apparatus 302 is larger than the number of fins 325*a* and 325*b* located on the side away from the fixing unit 322, being a heat source (see FIG. 11C).

When the rotating mirror deflector 311 generates heat due to high-speed rotation, the optical housing 313 expands due to the influence of the heat. However, since the straight distance "L" from the center of rotation of the rotating mirror deflector 311 to the respective synchronous detecting units 314*a* to 314*d* are substantially the same (see FIG. 11A), the mounting location of the respective synchronous detecting units 314*a* to 314*d* displaces likewise. Therefore, the detection timing of the scanning path in the respective scanning optical systems 312M, 312C, 312Y, 312Bk by the respective synchronous detecting units 314*a* to 314*d* changes likewise, thereby suppressing a misalignment of the respective scanning path in respective scanning optical systems 312M, 312C, 312Y, 312Bk. As a result, the scanning start position and the scanning end position of the respective scanning paths in the respective scanning optical systems 312M, 312C, 312Y, 312Bk can be uniformly arranged. Hence, out-of-color registration is suppressed when the respective color toner images formed based on the electrostatic latent images written by the scanning paths in the respective scanning optical systems 312M, 312C, 312Y, 312Bk are superposed on each other.

Since fins 325*a* to 325*d* are formed around the synchronous detecting units 314*a* to 314*d* in the optical housing 313, the surface area close to the synchronous detecting units 314*a* to 314*d* in the optical housing 313 increases because of these fins 325*a* to 325*d*, to increase the effect of heat radiation, thereby suppressing thermal expansion of the optical housing 313, as well as displacement of the synchronous detecting units 314*a* to 314*d* due to the thermal expansion of the optical housing 313. In other words, even when the optical housing 313 thermally expands, misalignment of the respective scanning paths in the scanning optical systems 312M, 312C, 312Y, 312Bk can be suppressed, by making the straight distance "L" from the center of rotation of the rotating mirror deflector 311 to the respective synchronous detecting units 314*a* to 314*d* substantially the same, and at the same time, the thermal expansion of the optical housing 313 can be reduced by the effect of heat radiation of the fins 325*a* to 325*d*. As a result, misalignment of the respective scanning paths in the scanning optical systems 312M, 312C, 312Y, and 312Bk can be further suppressed.

Further, since a temperature rise in the optical housing 313 is suppressed by the effect of heat radiation of the fins 325*a* to 325*d*, a change in refractive index of the lenses constituting the scanning optical systems 312M, 312C, 312Y, 312Bk, resulting from a temperature rise in the optical housing 313 can be suppressed, thereby enabling prevention of deterioration in the beam spot diameter of the scanning path.

Since the strength of the optical housing 313 is increased by forming the fins 325*a* to 325*d*, a periodic misalignment of the synchronous detecting units 314*a*, 314*b*, 314*c*, and 314*d* due to vibrations resulting from the rotation of the rotating mirror deflector 311, and vibrations transmitted from the driving unit in the image forming apparatus can be suppressed, thereby suppressing a periodic misalignment of the scanning path.

The heat generated from the rotating mirror deflector 311 is carried from the upstream side to the downstream side of the airflow in the flow direction by the airflow generated resulting from the rotation of the rotating mirror deflector 311. However, since the number of fins 325*b* (325*d*) located on the downstream side of the airflow in the flow direction is larger than that of the fins 325*a* (325*c*) located on the upstream side of the airflow in the flow direction (see FIG. 11B), heat radiation by the fins 325*b* (325*d*) is promoted on the downstream side of the airflow in the flow direction. As a result, the optical housing 313 thermally expands by the same degree on the upstream side and the downstream side of the airflow in the flow direction, and the mounting location of the respective synchronous detecting units 314*a* to 314*d* displaces likewise. As a result, out-of-color registration is suppressed when the respective color toner images formed based on the electrostatic latent images written by the scanning paths in the respective scanning optical systems 312M, 312C, 312Y, 312Bk are superposed on each other.

When the optical writing device 304 is fixed to the apparatus 302, the temperature is likely to rise on the side close to the fixing unit 322, being a heat source provided in the apparatus 302 in the optical housing 313. However, since the number of fins 325*c* and 325*d* located on the side close to the fixing unit 322 is larger than the number of fins 325*a* and 325*b* located on the side away from the fixing unit 322 (see FIG. 11C), heat radiation on the side close to the fixing unit 322 in the optical housing 313 is promoted by the fins 325*c* and 325*d*, and hence the optical housing 313 thermally expands by the same degree on the side close to the fixing unit 322 and on the side away from the fixing unit 322, and the mounting location of the respective synchronous detecting units 314*a* to 314*d* displaces likewise. As a result, out-of-color registration is suppressed when the respective color toner images formed based on the electrostatic latent images written by the scanning paths in the respective scanning optical systems 312M, 312C, 312Y, 312Bk are superposed on each other.

As explained above, the optical scanner of the present invention can be manufactured easily, and can suppress the influence of an interval change between the optical detecting units, resulting from thermal expansion, The optical scanner of the present invention having such a characteristic can be favorably used for the electrophotographic image forming apparatus, such as a copying machine, a printer, a facsimile machine, or a complex machine thereof.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner in an image forming apparatus, comprising:
    a laser source that emits a laser beam;
    a rotating mirror deflector that deflects the laser beam;
    a scanning optical system that forms an optical scanning path for scanning a peripheral surface of an image carrier with the laser beam deflected by the rotating mirror deflector;
    an optical detecting unit that detects a synchronous detecting beam that is a part of the laser beam deflected by the rotating mirror deflector; and
    an optical housing that houses at least the laser source, the rotating mirror deflector, the scanning optical system, and the optical detecting unit, wherein
    the optical detecting unit is arranged at a position on an optical path of the synchronous detecting beam in such a way that a direction of a displacement of the optical detecting unit resulting from a deforming of the optical housing due to a thermal expansion is on the optical path of the synchronous detecting beam.

2. The optical scanner according to claim 1, wherein the optical detecting unit is located outside of an image forming area, and arranged at two positions for detecting the write-start position and the write-end position.

3. The optical scanner according to claim 1, wherein the optical detecting unit is arranged in such a way that an incident angle of the synchronous detecting beam is substantially normal to an acceptance surface of the optical detecting unit.

4. The optical scanner according to claim 1, wherein the optical detecting unit is arranged opposite to the rotating mirror deflector, with the scanning optical system therebetween.

5. The optical scanner according to claim 1, wherein the optical detecting unit is arranged opposite to the laser source, with the rotating mirror deflector therebetween.

6. The optical scanner according to claim 1, wherein the optical detecting unit is arranged at a corner of the optical housing.

7. The optical scanner according to claim 1, wherein the optical detecting unit is arranged near a fastening portion of the optical housing where the optical housing is fastened to a main body of an apparatus.

8. The optical scanner according to claim 6, wherein the optical housing is made of resin.

9. An image forming apparatus comprising:
    an optical scanner that includes
        a laser source that emits a laser beam;
        a rotating mirror deflector that deflects the laser beam;
        a scanning optical system that forms an optical scanning path for scanning a peripheral surface of an image carrier with the laser beam deflected by the rotating mirror deflector;
        an optical detecting unit that detects a synchronous detecting beam that is a part of the laser beam deflected by the rotating mirror deflector; and
        an optical housing that houses at least the laser source, the rotating mirror deflector, the scanning optical system, and the optical detecting unit, wherein the optical detecting unit is arranged at a position on an optical path of the synchronous detecting beam in such a way that a direction of a displacement of the optical detecting unit resulting from a deforming of the optical housing due to a thermal expansion is on the optical path of the synchronous detecting beam;
    an image forming unit that includes an image carrier, forms a toner image by developing an electrostatic latent image written on the image carrier with a toner, and transfers the toner image onto a recording medium; and
    a fixing unit that fixes the toner image transferred on the recording medium.

* * * * *